US010567479B2

(12) United States Patent
Tal et al.

(10) Patent No.: US 10,567,479 B2
(45) Date of Patent: Feb. 18, 2020

(54) MANAGING A DEVICE CLOUD

(71) Applicant: Facebook, Inc., Menlo Park, CA (US)

(72) Inventors: Eran Tal, San Jose, CA (US); Martin Rehwald, Mountain View, CA (US); Francislav Penov, Kirkland, WA (US); Siyin Yang, Mercer Island, WA (US); Damian Kowalewski, Sunnyvale, CA (US); Georgiy Yakovlev, Pacifica, CA (US); Anupma Chhabra, Fremont, CA (US); Zachary Chee-Ping Lawrence, College Park, MD (US); Rizwan Ahmad, Menlo Park, CA (US); Dung Nguyen Tien, Newport News, VA (US); Angelica Estefania Escareno, San Francisco, CA (US); Aidymar Bigio, Hillsborough, CA (US)

(73) Assignee: Facebook, Inc., Menlo Park, CA (US)

(*) Notice: Subject to any disclaimer, the term of this patent is extended or adjusted under 35 U.S.C. 154(b) by 151 days.

(21) Appl. No.: 15/228,010

(22) Filed: Aug. 4, 2016

(65) Prior Publication Data

US 2017/0041381 A1 Feb. 9, 2017

Related U.S. Application Data

(60) Provisional application No. 62/201,496, filed on Aug. 5, 2015.

(51) Int. Cl.
*H04L 29/08* (2006.01)
*G06Q 50/00* (2012.01)
(Continued)

(52) U.S. Cl.
CPC .............. *H04L 67/10* (2013.01); *G06Q 10/10* (2013.01); *G06Q 50/01* (2013.01); *H04L 67/16* (2013.01);
(Continued)

(58) Field of Classification Search
CPC ......... H04L 67/10; H04L 67/16; H04L 67/30; H04L 67/42; H04L 12/66; H04L 63/08;
(Continued)

(56) References Cited

U.S. PATENT DOCUMENTS 7,813,697 B2 * 10/2010 McKillop ............. H04W 52/50
455/41.2
8,024,487 B2 * 9/2011 Bhanu ................... H04W 8/005
709/250
(Continued)

FOREIGN PATENT DOCUMENTS

GB 2 454 583 A 5/2009
WO 2006065996 6/2006
(Continued)

OTHER PUBLICATIONS

Communication, European Search Report, Annex to the European Search Report, European Patent Office, Patent Application No. EP 16 18 3055, dated Nov. 21, 2016.
(Continued)

*Primary Examiner* — Patrice L Winder
(74) *Attorney, Agent, or Firm* — Van Pelt, Yi & James LLP

(57) ABSTRACT

Particular embodiments of a gateway computing device may provide a provisioning service for access credentials for a restricted network. The gateway computing device may receive, from a client device, a request for the access credentials, wherein the request was sent over an open network using a restricted-packet-size protocol designed to limit power usage by devices sending messages using the protocol. The gateway computing device may segment data comprising the access credentials into a plurality of packets, wherein the plurality of packets conform to the restricted-packet-size protocol. Finally, the gateway computing device may send, over the open network to the client device, the segmented data using the restricted-packet-size protocol.

20 Claims, 5 Drawing Sheets

(51) Int. Cl.
   *G06Q 10/10*   (2012.01)
   *H04W 12/06*   (2009.01)
   *H04W 12/04*   (2009.01)
   *H04W 12/00*   (2009.01)
   *H04L 29/06*   (2006.01)
   *H04W 4/80*    (2018.01)
   *H04W 4/21*    (2018.01)
   *H04W 84/12*   (2009.01)

(52) U.S. Cl.
   CPC ............ *H04L 67/30* (2013.01); *H04L 67/42* (2013.01); *H04W 12/0023* (2019.01); *H04W 12/04* (2013.01); *H04W 12/06* (2013.01); *H04L 67/28* (2013.01); *H04L 67/2823* (2013.01); *H04W 4/21* (2018.02); *H04W 4/80* (2018.02); *H04W 84/12* (2013.01); *Y02D 70/00* (2018.01); *Y02D 70/10* (2018.01); *Y02D 70/1222* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/22* (2018.01); *Y02D 70/23* (2018.01); *Y02D 70/26* (2018.01)

(58) Field of Classification Search
   CPC ....... H04L 63/10; H04L 67/20; H04L 67/327; H04L 67/2823; H04L 67/28; G06Q 50/01; G06Q 10/10; H04W 12/06; H04W 12/04; H04W 12/0023; H04W 4/80; H04W 4/21; H04W 84/12; Y02D 70/164; Y02D 70/142; Y02D 70/10; Y02D 70/22; Y02D 70/1222; Y02D 70/14; Y02D 70/166; Y02D 70/146; Y02D 70/162; Y02D 70/144; Y02D 70/26; Y02D 70/00; Y02D 70/23
   See application file for complete search history.

(56) References Cited

U.S. PATENT DOCUMENTS

| | | | |
|---|---|---|---|
| 8,121,109 B2 | 2/2012 | Sibileau | |
| 8,499,245 B1 | 7/2013 | Froment | |
| 8,554,559 B1 | 10/2013 | Aleksic | |
| 8,825,020 B2 | 9/2014 | Mozer | |
| 8,849,246 B2* | 9/2014 | Daigle | H04L 9/3228 455/411 |
| 9,047,271 B1 | 6/2015 | Mengibar | |
| 9,054,961 B1* | 6/2015 | Kim | H04L 41/0806 |
| 9,071,967 B1* | 6/2015 | Davies | H04W 12/06 |
| 9,207,659 B1 | 12/2015 | Sami | |
| 9,305,554 B2 | 4/2016 | Jagatheesan | |
| 9,378,467 B1 | 6/2016 | Chaiyochlarb | |
| 9,398,490 B2* | 7/2016 | VanderZee | H04W 28/065 |
| 9,413,827 B2 | 8/2016 | Sharma | |
| 9,451,434 B2 | 9/2016 | Baldwin | |
| 9,465,369 B2 | 10/2016 | Saha | |
| 9,465,668 B1* | 10/2016 | Roskind | H04W 12/06 |
| 9,489,616 B2 | 11/2016 | Sharma | |
| 9,563,431 B2* | 2/2017 | Tamir | G06F 9/3867 |
| 9,565,172 B2* | 2/2017 | Stahl | G06F 21/33 |
| 9,590,818 B2 | 3/2017 | Capuozzo | |
| 9,635,536 B2* | 4/2017 | Narang | H04W 8/005 |
| 9,654,434 B2 | 5/2017 | Sone | |
| 9,699,768 B2* | 7/2017 | Werb | H04W 4/70 |
| 9,727,115 B1 | 8/2017 | Brown | |
| 9,767,091 B2 | 9/2017 | Sarikaya | |
| 9,806,900 B2* | 10/2017 | Jacobson | H04L 12/2814 |
| 9,845,070 B2* | 12/2017 | Petel | B60R 25/246 |
| 10,044,674 B2* | 8/2018 | Liu | H04W 12/06 |
| 10,091,272 B2 | 10/2018 | Cho | |
| 10,116,596 B2 | 10/2018 | Li | |
| 10,181,960 B2 | 1/2019 | Kim | |
| 10,274,911 B2 | 4/2019 | Uppala | |
| 2001/0041980 A1 | 11/2001 | Howard | |
| 2003/0078032 A1 | 4/2003 | Pei | |
| 2005/0037708 A1 | 2/2005 | Torvinen | |
| 2005/0044225 A1 | 2/2005 | Ota | |
| 2005/0096913 A1 | 5/2005 | Coffman | |
| 2006/0053229 A1 | 3/2006 | Choi | |
| 2007/0030848 A1* | 2/2007 | Miyata | H04L 12/4633 370/389 |
| 2008/0268882 A1 | 10/2008 | Moloney | |
| 2009/0204578 A1 | 8/2009 | Dang | |
| 2010/0263032 A1 | 10/2010 | Bhuyan | |
| 2011/0098029 A1 | 4/2011 | Rhoads | |
| 2011/0106779 A1 | 5/2011 | George | |
| 2011/0173542 A1 | 7/2011 | Imes | |
| 2011/0252240 A1 | 10/2011 | Freedman | |
| 2012/0084568 A1* | 4/2012 | Sarikaya | H04L 9/3066 713/176 |
| 2012/0166380 A1 | 6/2012 | Sridharan | |
| 2012/0204233 A1 | 8/2012 | Rubio | |
| 2012/0284785 A1* | 11/2012 | Salkintzis | G06F 21/43 726/7 |
| 2013/0006903 A1 | 1/2013 | Vishwakarma | |
| 2013/0065584 A1 | 3/2013 | Lyon | |
| 2013/0080520 A1 | 3/2013 | Kiukkonen | |
| 2013/0080898 A1 | 3/2013 | Lavian | |
| 2013/0124194 A1 | 5/2013 | Nadal | |
| 2013/0254315 A1 | 9/2013 | Solyanik | |
| 2013/0283358 A1 | 10/2013 | Manroa | |
| 2013/0285800 A1 | 10/2013 | Liu | |
| 2013/0305330 A1 | 11/2013 | Palanigounder | |
| 2014/0041055 A1 | 2/2014 | Shaffer | |
| 2014/0090034 A1 | 3/2014 | Fyke | |
| 2014/0108935 A1 | 4/2014 | Yuen | |
| 2014/0109835 A1 | 4/2014 | Colvin | |
| 2014/0120901 A1 | 5/2014 | Ward | |
| 2014/0164611 A1 | 6/2014 | Molettiere | |
| 2014/0172123 A1 | 6/2014 | Lee | |
| 2014/0188935 A1 | 7/2014 | Vee | |
| 2014/0201133 A1 | 7/2014 | Kawabata | |
| 2014/0330809 A1 | 11/2014 | Raina | |
| 2014/0359018 A1 | 12/2014 | Sun | |
| 2014/0369275 A1 | 12/2014 | Fleck | |
| 2015/0019553 A1 | 1/2015 | Shaashua | |
| 2015/0058226 A1 | 2/2015 | Gupta | |
| 2015/0067541 A1 | 3/2015 | Owens | |
| 2015/0094080 A1* | 4/2015 | Bleecher Snyder | H04W 4/02 455/456.1 |
| 2015/0163121 A1 | 6/2015 | Mahaffey | |
| 2015/0172997 A1 | 6/2015 | Griot | |
| 2015/0201446 A1 | 7/2015 | Linsky | |
| 2015/0263891 A1* | 9/2015 | Baugher | H04L 41/0806 370/254 |
| 2015/0279366 A1 | 10/2015 | Krestnikov | |
| 2015/0309492 A1 | 10/2015 | Patel | |
| 2015/0317801 A1 | 11/2015 | Bentley | |
| 2015/0350910 A1* | 12/2015 | Eramian | H04W 12/08 726/6 |
| 2016/0021039 A1 | 1/2016 | Woo | |
| 2016/0072840 A1 | 3/2016 | Iyer | |
| 2016/0080343 A1* | 3/2016 | Robinton | H04W 12/04 726/4 |
| 2016/0100311 A1* | 4/2016 | Kumar | H04L 63/123 726/7 |
| 2016/0119859 A1* | 4/2016 | Liu | H04W 48/10 370/311 |
| 2016/0195856 A1 | 7/2016 | Spero | |
| 2016/0219038 A1 | 7/2016 | Stephenson | |
| 2016/0225372 A1 | 8/2016 | Cheung | |
| 2016/0302060 A1 | 10/2016 | Agardh | |
| 2017/0196044 A1* | 7/2017 | Nord | H04W 52/0258 |
| 2017/0201931 A1* | 7/2017 | Swanzey | H04W 76/10 |

(56) References Cited

U.S. PATENT DOCUMENTS

2017/0295025 A1\* 10/2017 Meriac .................. H04L 9/3263
2018/0160358 A1\* 6/2018 Nenner .................. H04W 4/70

FOREIGN PATENT DOCUMENTS

| WO | WO 2014/172567 A1 | 10/2014 |
|---|---|---|
| WO | WO 2015/006045 A1 | 1/2015 |
| WO | WO 2015/050892 A1 | 4/2015 |
| WO | WO 2015/092484 A1 | 6/2015 |

OTHER PUBLICATIONS

Communication, European Search Report, Annex to the European Search Report, European Patent Office, Patent Application No. EP 16 18 3058, dated Nov. 21, 2016.
Communication, European Search Report, Annex to the European Search Report, European Patent Office, Patent Application No. EP 16 18 3068, dated Nov. 21, 2016.
Jong-Ho Choi, Dong-Oh Kang, Joon Young Jung, and Changseok Bae, "Estimating Social Tie Strength for Autonomous D2D Collaborations," International Journal of Future Computer and Communication, vol. 4, No. 1, Feb. 2015.
International Search Report and Written Opinion for International Application PCT/US2016/045684, dated Nov. 8, 2016.
International Search Report and Written Opinion for International Application PCT/US2016/045680, dated Nov. 9, 2016.
International Search Report and Written Opinion for International Application PCT/US2016/045689, dated Nov. 10, 2016.
International Search Report and Written Opinion for International Application PCT/US2016/045683, dated Nov. 10, 2016.
International Search Report and Written Opinion for International Application PCT/US2016/045679, dated Nov. 15, 2016.
Communication, European Search Report Annex to the European Search Report, European Patent Office, Patent Application No. EP 16 18 3066, dated Nov. 21, 2016.
Communication, European Search Report, Annex to the European Search Report, European Patent Office, Patent Application No. EP 16 18 3067, dated Nov. 21, 2016.

\* cited by examiner

MANAGING A DEVICE CLOUD

PRIORITY

This application claims the benefit, under 35 U.S.C. § 119(e), of U.S. Provisional Patent Application No. 62/201,496, filed 5 Aug. 2015, which is incorporated herein by reference.

TECHNICAL FIELD

This disclosure generally relates to a network of objects embedded with electronics and software to enable objects to exchange data with a system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH ("BT") communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a device cloud of connected devices may communicate with a local gateway over multiple network protocols, such as, for example BLUETOOTH LOW ENERGY ("BTLE"), WIFI, ZIGBEE, ZWAVE. In particular embodiments, one of the network protocols may restrict access to those devices that have presented valid credentials. In particular embodiments, one of the network protocols may allow transmission of information prior to pairing and/or presentation of valid credentials, wherein the transmitted information is limited to being sent using packets that are restricted in size.

In particular embodiments, the gateway may broadcast information regarding its provisioning service, the gateway may provide the valid credentials to one of the devices using the restricted-size packets by segmenting the data comprising the valid credentials to fit into the payloads of a plurality of the restricted-size packets. Once transmitted, the restricted-size packets may be reassembled into the data comprising the valid credentials.

The restricted-size packets may each include a header and a payload. The header of each of the restricted-size packets may contain sequencing information, such as the total number of restricted-size packets into which the data comprising the valid credentials was segmented and the order of that particular restricted-size packet within the set of restricted-size packets. After transmitting each restricted-size packet over the network, the data comprising the valid credentials may be reassembled by using information in each of the headers to identify the information in each of the payloads.

In particular embodiments, the gateway may assess authorization of the device to receive the valid credentials in real time upon receiving the request from the device. In particular embodiments, the gateway may have previously received or retrieved and cached authorization information regarding one or more devices prior to receiving the request.

The embodiments disclosed below are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
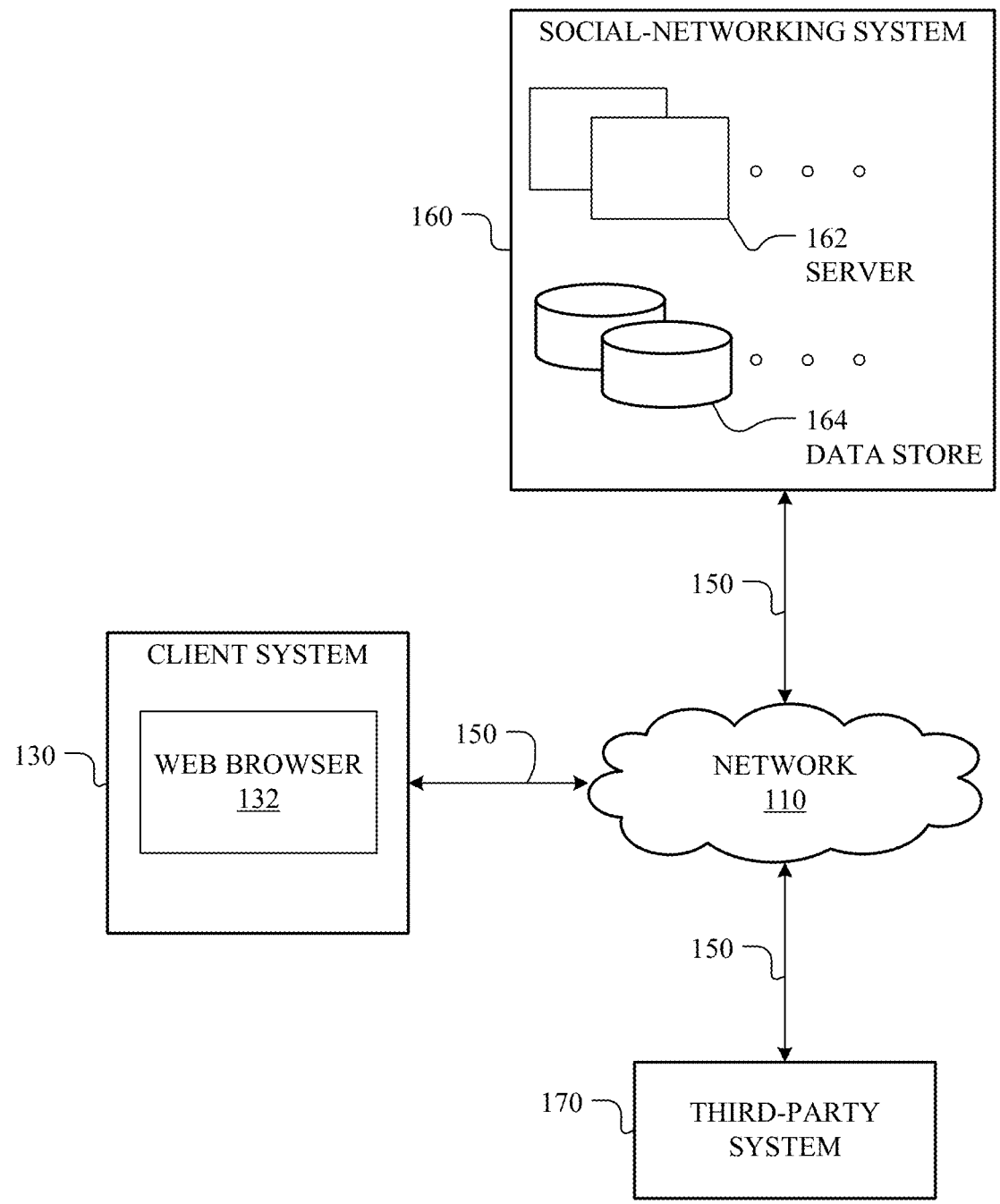
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
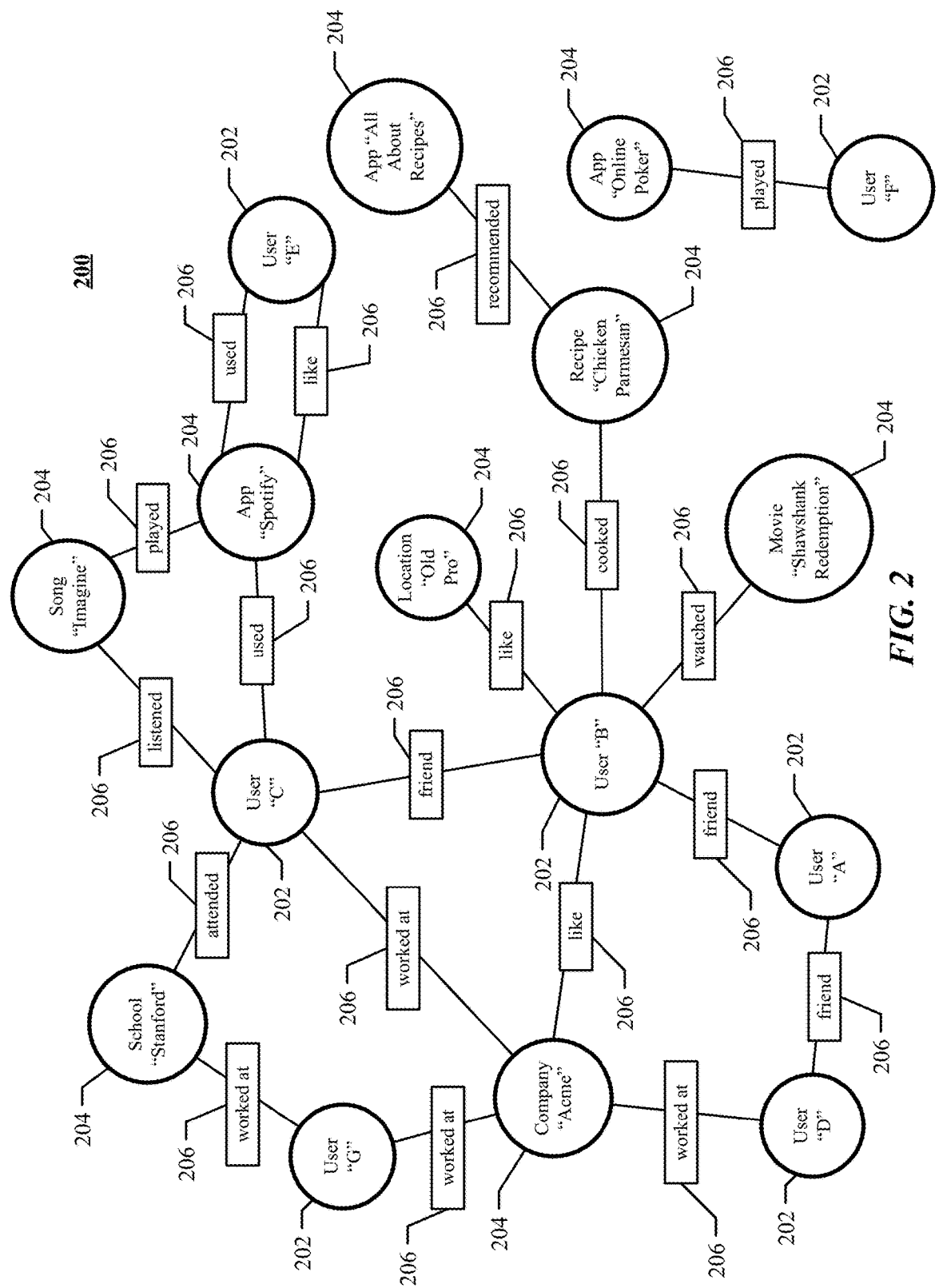
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition to or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express him or her self. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044, 506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (e.g., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object may have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Overview of Connected Device Management and a Gateway-Based System

In particular embodiments, the system may provide limitless benefits to the consumer/supplier/retailer/etc. In particular embodiments, the system may provide photos and/or videos for home monitoring and communicating with family—potentially using local (and not necessarily cloud) storage, and may access photos and videos stored in an online system, if connected. In further embodiments, the system may provide a social WIFI, in which the system may authorize a user's friends to join a particular WIFI with no login necessary. In further embodiments, the system may provide robust privacy controls, in which the system may enable people to share data (to a social networking system/ partners/third party applications) in contexts in which they may understand, may see the benefits of sharing the data, and may provide consent. In further embodiments, the system may provide information as to who is at home and when a particular person left; this may be extended to friends nearby. In further embodiments, the system may provide virtual security whereby the system may provide constant updates to a gateway ("GW") for protection against virus, malware, phishing, etc. In further embodiments, the system may use notifications to update based on any type of home event and also the ability to remotely trigger siren and/or contact emergency services (e.g., by dialing 911).

Perfect Home Experience: In particular embodiments, any combination of products may provide a more seamless experience at home. In particular embodiments, instead of requiring the attention and effort of a user at home, providing a system that is able to provide location awareness, identify multiple individuals, and incorporate machine learning support may enable a user to have their house configure and adapt itself, as well as responding to user commands. For example, the system may provide a more seamless experience to use and configure an automated functionality for security-related devices, such as cameras, door sensors, door locks and motion sensors.

In particular embodiments, the system may create an open platform for connecting the home into a seamless wireless experience. In particular embodiments, the system may provide a solution that harnesses a social network's key assets (e.g., identity, social graph, security, expertise driving open and affordable reference designs) to improve the home and the family's experience interacting with its home. In particular embodiments, the system may enable an open platform to support and provide value to Internet of Things (IoT) device providers.

Figure 3:
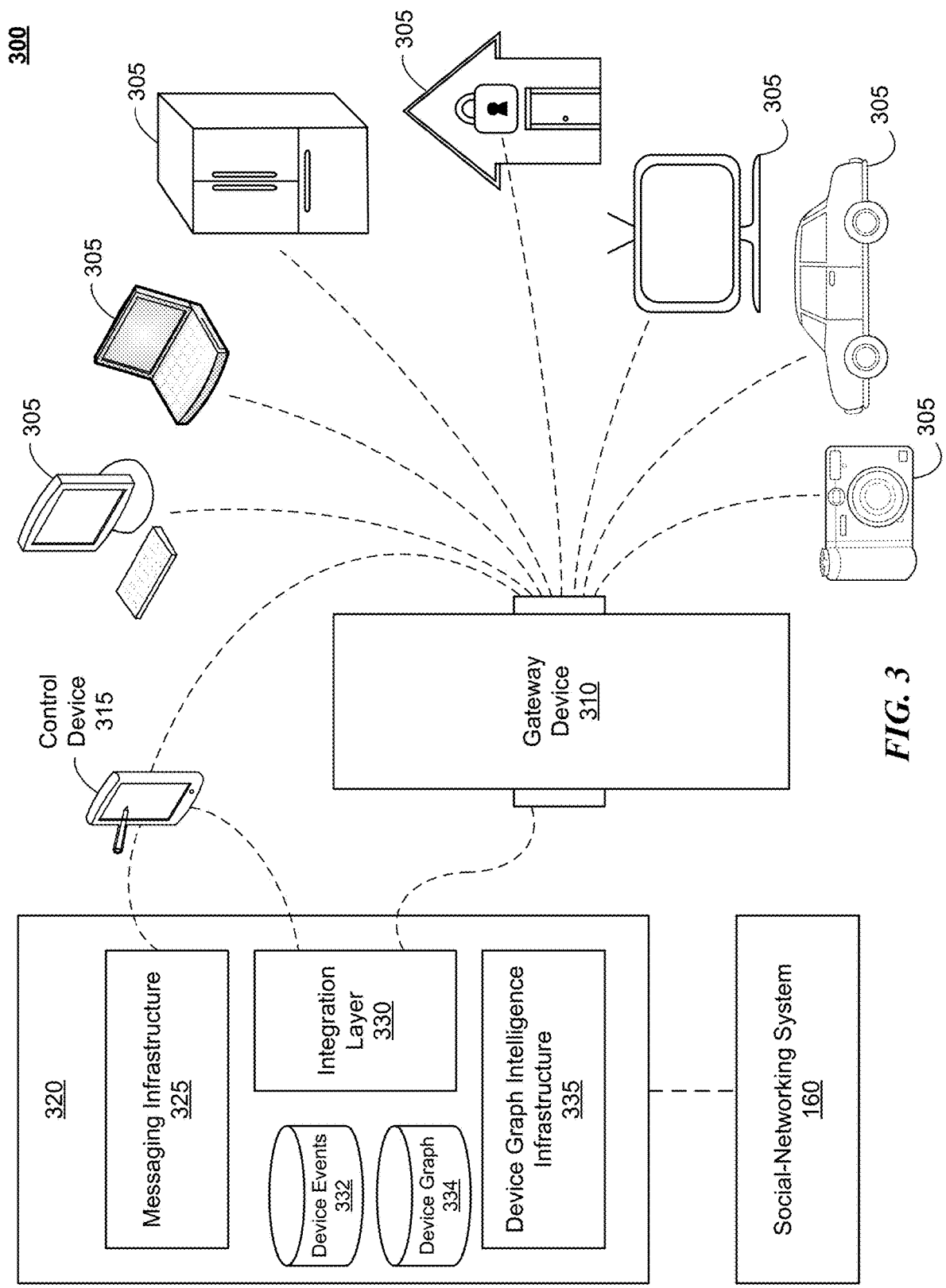
FIG. 3 illustrates an example architecture for managing a device cloud.

FIG. 3 illustrates an example architecture for managing a device cloud comprising a specified set of devices. In particular embodiments, system 300 may comprise a gateway device 310 (residing in a particular physical location) communicating with a number of connected devices 305 and a control device 315. Connected devices 305 may include anything from complex embedded computing devices to switches to simple sensors—for example, the connected devices depicted in FIG. 3 include a desktop computer, a laptop, a refrigerator, a home security system, a television, a vehicle, and a single-lens reflex ("SLR") camera. These are just provided as examples, one of ordinary skill in the art would realize many other suitable types of devices. Control device 315 may present a user interface (e.g., by way of an installed application, a browser, a SMS texting interface, or an interface provided by the device's operating system) for interacting with gateway device 310 and with connected devices 305 (by way of gateway device 310). In particular embodiments, system 300 may comprise a plurality of gateway devices 310 that communicate with each other. In particular embodiments, control device 315 may include one or more UI clients (e.g., a messaging service application), which act as the main user experience ("UX") point. Control device 315 may include social networking application or other mobile application—a helper application, used for initial provisioning, BLUETOOTH and location discovery, and generally anything permission related that the messaging application service application cannot do.

Gateway device 310 may interface with a backend system 320, which may be hosted on a remote server or group of servers. Backend system 320 may comprise a messaging infrastructure 325 (e.g., to communicate with control device 315), an integration layer 330 (e.g., a platform and/or API to interface with a diverse array of connected devices, such as PARSE) to interface between elements of backend system 320 and gateway device 310 (and/or control device 315 and/or directly with connected devices 305). Backend system 320 may maintain a data store 332 of device events, comprising data received from gateway device 310 and each of the connected devices 305, as well as data derived therefrom. Backend system 320 may also maintain a data store 334 for one or more device graphs, in which gateway device 310 and each of connected devices 305 may each be represented by a device node with edges connecting the device nodes. Backend system 320 may include a device graph intelligence infrastructure 335 for processing and analyzing the device events, updating the device graph, and providing feedback and/or instructions to connected devices 305 and/or control device 315. Backend system 320 may also communicate with social-networking system 160. In particular embodiments, certain functionality may be provided by gateway device 310, by backend system 320, or by a combination thereof.

Such an architecture may be used for the devices present within a defined physical space, (e.g., a house, an office building, or a park) or with a set of devices related to a particular user or entity (e.g., those associated with a user with connected devices in their home, their car, and their small retail business, or those belonging to a property management business managing door locks and alarm security systems for a group of buildings)—in this latter scenario, each of the physical locations (e.g., house, car, and business) may each need their own gateway device.

In particular embodiments, system 300 may expand the capabilities of a gateway device to serve as a central home computer and IoT hub. In further embodiments, the system may provide local storage and support for all critical wired and wireless protocols for broadband access to the outside world and communication between devices within the home at exceptional quality. In further embodiments, the system may develop analytic tools for connected third party devices and broadband devices. In further embodiments, the system may establish open principles, run on standard protocols, generic hardware, open source operating systems, Open APIs, etc. In further embodiments, the system may contribute potential improvements in hardware and firmware wireless technology to communities of hardware builders.

In particular embodiments, a gateway device may refer to any computing device capable of supporting the required functionality to facilitate local network control of smart/connected device(s) and act as a local gateway for a service that may run in the cloud. In particular embodiments, the service may facilitate communication with the user. In particular embodiments, the system and the user may communicate using natural language (which may then be parsed). In particular embodiments, a user may use a messaging application to communicate with a gateway device and/or with any of the connected devices (by way of the gateway device).

In particular embodiments, a control application running on control device 315 may refer to a browser-based application or another application installed on control device 315. In particular embodiments, the control application may be used by the user to provision devices. In further embodiments, the application may provide a specific phone user experience for the used based on particular scenarios.

In particular embodiments, the devices may be provisioned using BLUETOOTH, NFC, or any other appropriate form of communications between connected device 305 and gateway device 310.

Features of Connected Device Management Using a Gateway-Based System

Communications—leverage a social networking graph to easily connect with people within the house or anywhere globally (VOIP, video calling)—also enable incoming photo caller ID pulling from a social networking graph (a social networking application may contact sync on phones)

Energy Efficiency: Thermostat, vents, light control, blind control, selective power times (car charging, laundry, dishwasher) and monitoring.

Audio & Video—unicast or multicast from any device to any device

Personal Assistant—leverage natural language processing technology to be able to verbally communicate with your home Climate Sensor—track temperature, humidity, air quality, etc., with ability to send alerts if issues HouseFeed—surface most relevant social-networking system or 3rd party info/stories, based on time of day, for each surface within the house with a display (weather, birthdays, relevant news/public content, offers/deals, ads, etc.). Effectively the concept of Audience Network but expanding beyond just ads and displaying info on all relevant surfaces.

Easy Sharing—May make it easy to share any content surfaced on any display in the house via a social-networking application, a social media photo sharing application, a messaging application, etc.

In particular embodiments the system may provide an automated shopping experience, in which the system may track purchasing and consumption habits to assist in automating recurring purchases for consumables.

In particular embodiments, the system may provide superior in home connectivity for all IoT devices (the platform as a product). In further embodiments, there may be no need for dedicated hubs for different home control devices.

In particular embodiments, the system may provide insight to a user's purchasing decisions. In further embodiments, awareness of the home and its dwellers can provide more detailed insight as to how exactly someone goes about making a purchase decision. Physical location in home, devices used, number of family members viewing item, conversations, time between viewing, etc. could all be sensed and used in gaining a deeper understanding to the steps people go through in making purchase decisions and closing the loop on digital ads to physical purchasing (critical to measuring ad spend ROI).

In further embodiments, the system may provide a method for optimizing ads and content based on the activity of what is happening within the system. For example, understanding the current environment in the home can help in both providing more appropriate consumption content to family members (whether through Facebook, or media content in the home), or determine the most appropriate timing to show ads. From simple things like advertising for things that are missing or broken in the home, to showing the cool car advertisement not when mommy and daddy are running around and only checking notifications between feeding the kids and putting to bed, but rather when they are leisurely scrolling news feed while the TV is playing a show that only one of them watches passionately.

In particular embodiments, the system may leverage a social-networking system, a social graph associated with a social-networking system, particular identities in a social graph, notifications provided to users, and an "open platform" approach.

In particular embodiments, the gateway may be an application that runs on a local gateway device connected to the user's home network. Its responsibilities consist of understanding and dealing at "physical" level with the various smart/connected devices the user owns, including, but not limited to: discovery and provisioning of new devices over BLUETOOTH, ZIBGEE, ZWAVE, WIFI (access point and direct); mapping of physical devices to device type and device ID; mapping of device type to available capabilities; grouping/association of devices in vertical (same capabilities, e.g., "lights" or "door locks"); support for understanding various industry protocols, for example ALLJOYN, THREAD, WEAVE, ZIGBEE, etc.; translating specific intents (e.g., associated with specific device IDs) passed from backend system 320 into direct control and query messages (e.g., "device ID(s) XXX on" passed on from gateway device-->"Phillips Hue device ID XXX turn on"); translating specific device notifications into logical notifications that can be interpreted by backend system 320 (e.g., "August SmartLock device id XXX unlocked"-->"device ID XXX unlocked"). In particular embodiments, while the gateway device does some mapping between physical and logical devices, it still converts these into machine-readable structured formats.

In particular embodiments, a gateway device (e.g., based on a RASPBERRY PI platform running RASPIAN Linux and supporting WIFI, BLUETOOTH, ZWAVE and ZIGBEE dongles) may be used to host the gateway application. In particular embodiments, the gateway application may be supported by a limited number of devices, in particular, but not limited to: support discovery and provisioning of two or more connected lights from multiple vendors (e.g., PHILLIPS HUE, BELKIN WEMO WIFI switch, ZIGBEE or ZWAVE smart switch); control of one or more pre-provisioned smart locks (e.g., LOCKITRON, AUGUST); control and streaming of music and/or video to multiple targets over WIFI-connected speakers and/or smart TVs and the gateway device itself (e.g., HDMI port).

In particular embodiments, backend system 320 comprises an application/service running in the cloud and talking to gateway device 310. It may handle integration with messaging applications and natural language processing systems (NLP), translation of the user's intent to specific logical device control intents (e.g., using NLP and context awareness), and machine learning (ML) to infer complex behavior rules involving multiple devices. In particular embodiments, backend system 320 may only interface with individual ones of connected devices 305 by way of gateway device 310. In particular embodiments, backend system 320 may deal with logical devices (e.g., "lights" vs "PHILLIPS HUE"), aliases assigned by a user (e.g., "front porch light") and device groups (e.g., "all lights"). As such, backend system 320 may provide one or more of the following interfaces and capabilities:

Association of human naming of devices with logical ID provided by Home Gateway (e.g., user chooses name "Front Door Light" for a device id); Grouping/association of devices along a horizontal (same location, e.g., "living room" or "front door);

Mapping of device capabilities to human input/output commands;

Translating specific intents passed from the user associated with the specific names they have assigned devices into a device ID based actions. (e.g., "Turn on Front Porch Light"→"device id(s) XXX on");

Translating specific device notifications passed forward by the home gateway into human readable format (e.g., "device ID XXX unlocked"→"Front Door Unlocked").

In particular embodiments, additional features provided by system 300 may include: NLP control and notifications of one or more devices through a messaging application, explicit grouping of devices by the user, and creating and executing multi-device instructions (e.g., "when front door is unlocked, turn the lights there on").

In particular embodiments, to be able to interpret commands in a context aware fashion, the logic relies on a view on the device graph based on userID (the user who wants to take action) and/or location information (e.g., based on signals like cell IDs of mobile networks around, WIFI geolocation, visible SSIDs etc. in addition to strong localization via GPS coordinates). For example, a user might be associated with multiple home gateways (e.g., primary family home, weekend condo, secondary home), in which case location information may determine to which devices a particular command should apply. In particular embodiments, the system may provide for configuration of user role settings (user, command and location-based) in the device graph (e.g., permission models may allow for configuration of an admin role for full control and a limited user role with limited permissions). For example, a user may not want their kids (who are playing in the living room where the stereo system is located) to change the music the user is currently enjoying while working in his home office.

Object Types: In particular embodiments, the various object types (one or more of which may be represented by a node or as attributes of a node in the device graph) may include: Device; Device Group; Home Gateway; User; Zone (maybe not an object but serialized data as attribute in Home Gateway and Zone IDs used in association between device and Gateway); Device capability Set.

Associations (Some of which May be Represented as Edges in the Device Graph):

Device ↔GW: n:1, possibly n:m allowing one device to be controlled by multiple gateways. As of above might optionally carry a zone ID.

User ↔Home GW: n:m, need to think about roles like admin, primary user, guest.

User ↔Device: n:m, association could carry permissions as data.

Device ↔Device Group. Not sure yet whether we need this as persistent association in the data model or dynamically generate the grouping in the command context interpretation engine.

Device ↔device capability set.

Example Provisioning Flow: After installing the control app on control device 315, smart device power-on may induce a trigger to generate a notification on the mobile application. (In particular embodiments, the application may provide a BTLE service that will allow the transfer of data without explicit/manual pairing (any user action).) The control app may then present a single-click provisioning step to user, requiring entry of WIFI credentials generating a unique session token (WIFI credentials may be provided automatically if the user is logged into an online application connecting to the backend system). After authentication, the device may connect to gateway device 310. For certain devices, a deep link into a third-party app may be presented. Finally, the user may be prompted to select which types of information (stored in a server) the user is willing to expose to the app.

Example Control App: In particular embodiments, the application may enable viewing connected devices, setup of rules, and pushing status updates from the connected devices to the messaging application on the control device.

Login and Provisioning: In particular embodiments, there may be multiple options for implementing user login. In particular embodiments, the system may transfer relevant user information from a user's online profile page. In further embodiments, the system may create a profile, for example, the user may have to walk through a profile creation if the profile did not exist on the system before. In further embodiments, the system may gain proprietary use of the profile framework to create a developer's own user sign-in process.

People Information Transfer: In particular embodiments, the system may enable the transfer of personal information. In further embodiments, the system may include a user authentication token. In further embodiments, the identified account information may be fetched by the device once connected to the internet with the user token. In particular embodiments, a user may be authenticated by, but not limited to: a name, profile name, e-mail, phone number, or family circle. In further embodiments, information may be transferred by WIFI networks, BLUETOOTH MACs, or other associated IoT devices.

IoT Device Association: In particular embodiments, the system may enable pre-provisioning by associated the user and connectivity information with a particular product at the time of purchase (point of sale). In further embodiments, the system may include a package, which may enable associations between different interfaces. For example, but not limited to: WIFI networks—pass networking login information to IoT device, and optional user token; BLUETOOTH—pair mobile device with IoT device, and optional user token; Ethernet—optional user token; Enablement of ZIGBEE and ZWAVE pairing.

Third Party Platform Integration: In particular embodiments, the system may provide enabling integration for IoT products built to communicate with other smart platforms.

In particular embodiments, the system may provide a seamless out-of-the-box experience with IoT products and the ability to intelligently connect IoT devices from different manufactures. In particular embodiments, the system may provide reduced required resource investments for building a foundational infrastructure for IoT products. In particular embodiments, the system may provide the potential to intelligently interconnect with other IoT devices without platform restrictions.

Connected Home Services: Setting Up the Gateway Device

In one example embodiment, the gateway device may be based on any standard computing device or server and a USB power cable; MICRO SD card and a MICRO SD card to standard SD card adapter; WIFI dongle; and BLUETOOTH Dongle; HDMI cable and monitor; and ZWAVE Dongle. In particular embodiments, the gateway device may comprise any computing device comprising a processor, close-range networking capability, and the capacity to perform some or all of the functionality described herein.

Set Up Image: In particular embodiments, the method may begin by obtaining the home gateway image and installing an application on the gateway device. In particular embodiments, a MICRO SD card (using the MICRO SD card adaptor) may be inserted into the gateway device. In particular embodiments, the gateway device may then run an application and restore the home gateway image onto the MICRO SD card. In further embodiments, the MICRO SD card (through the application) may be ejected before removing the MICRO SD card from the gateway device.

Provisioning Home Gateway: In particular embodiments, an HDMI cable may be inserted into the gateway device to view the output of particular steps, however viewing the output is not required. In particular embodiments, the HDMI cable/monitor may be substituted for a USB-Serial cable that may be plugged into the gateway device, which may be used to screen into/dev/cu.usbserial-*** with a baud rate of 115200. In particular embodiments, if connecting to gateway device in this method, you may (1) kill the pid found in "ps-A|grey node" and (2) run "node/user/sharegateway/start.js"

In particular embodiments, the MICRO SD card may then be inserted into the gateway device. In further embodiments, it may be confirmed that all the dongles are attached and powered on. In particular embodiments, the gateway device may reboot a few times at which point it may wait to be provisioned onto the WIFI. In further embodiments, the control application may be used to locate the home gateway. In further embodiments, the SSID and password credentials may be passed to the home gateway. In further embodiments, the gateway device may then reboot and attempt to join the WIFI network.

In particular embodiments, upon the gateway device rebooting, the home gateway may be added as a new device. In further embodiments, permission may need to be granted to the application. In particular embodiments, the home gateway may now be provisioned onto the WIFI network. In further embodiments, a server may send a message to the computing device or client alerting the user of the newly established gateway.

The following example scenarios describe various use cases from a first-person perspective.

Scenario 1—After setting up my new Samsung TV, I followed the prompts to Log In my device using a specified app on my smartphone. I almost wasted time typing in my phone number at the prompt, when I noticed the optional QR code, and avoided clicking altogether. Once I had snapped the code using the specified app on my phone, I was able to log into my TV using my phone. After that, the specified app also gave me the option to log in other apps on my TV if I wanted to, without any more QR codes. Not only was this easy—with no passwords or anything, but I discovered the interesting apps on my TV. With just a few taps, I had configured Hulu, Netflix, USA Today and Fandango on my TV. When friends are over, I sometimes set my TV to a slideshow based on one of my photo albums using the specified app.

Scenario 2—I was bored and clicking through the menu on my SLR camera when I noticed an option to Log In with the specified app. When I clicked it, the screen on the back of my phone turned into a QR code, with instructions to Log In using the specified app on my phone. When I did, my phone knew what brand of camera I was logging into, and asked me if I wanted to give my camera access to my online photo albums. Now, when my camera is on WIFI, it automatically loads my photos into an album in the specified app, that I have set to be visible to just me. Also, I've noticed that now when I post stories online, the story composer is aware of photos I took with my camera and lets me attach them to the post even though I am posting from my phone or desktop computer. This makes sharing high quality photos dead simple.

Scenario 3—My friend drops by my apartment to watch Game of Thrones together. We normally watch at her place, because she has HBO, but today she brought her iPad to my place so we can watch it on that. When she launched HBO, she got a notification that there is a TV in the room owned by one of her social connections (Me!) and would she like to stream her show on that (my) device. (She was not notified of my neighbor's televisions, due to the consideration of location information). She confirms to stream her show on my device, and we watch in style.

In particular embodiments, provisioning of a home gateway may occur over BLUETOOTH LE. In particular embodiments, a service with several characteristics may be implemented:
- (Read-Only) device public key: All data written to any write characteristic needs to be encrypted with this public key.
- (Write-Only) password. Initially blank, but in particular embodiments may be set to something else. In particular embodiments, the password is never sent in plain text. In further embodiments, once set, all data written to any write characteristic is either hashed or prepended with the password, before it's encrypted with the public key. In further embodiments, the initial password may be set at a manufacturing time and printed on the device label.
- (Read-Write) Device name, initial value, "home gateway xxxxx," where xxxxx is the last six digits of the MAC address of the Ethernet card.
- (Read-Only) version
- (Read-Only) IP address
- (Read-Write) WIFI SSID
- (Write-Only) WIFI password
- (Write-Only) Command. In particular embodiments, may be one of "reboot," "reset," "update," etc.
- (Read-Write) echo. In particular embodiments, may be used to test whether a BT client may connect to the device with a password.

In particular embodiments, once the user is logging in, the application may run periodic BT scans for connected home services devices. In further embodiments, for unknown connected home services devices nearby: the system may test the echo characteristics to check if the device is password protected; show notifications to the user about the device; if the user clicks on the notification, ask if the user wants to add it; if the device is password protected, will ask the user for the password; if not password protected, simply add device.

In particular embodiments, for known connected home services devices nearby: if device is connected, cache the status; test the cached password with echo characteristics, if the password has been changed, show notification to the user; if the device is not connected, show notification to the user; if the user clicks on either notifications, ask for password of WIFI credentials. In particular embodiments, all of these can be done through the device details screen. In further embodiments, the details screen will offer ability to rename the device, set/change the password, disconnect/update WIFI explicitly, or execute any of the supported commands.

In particular embodiments, elements of system 300 may include an API to provide access profiles for applications interfacing with system 300, such as:
- gateway device 310: the central entity in the home interfacing all devices of that home and providing local access as well as the offline experience;
- backend system 320: controls the home with natural language from messaging application;
- a mobile app or browser-based management interface (either one running on control device 315) to manage the home.

In particular embodiments, the system may (1) expose a set of Platform API methods and (2) based on App ID for the above interfaces, manage profiles with app capabilities. To avoid the possibility that different clients fall out of sync with respect to information stored in the data store, particular embodiments may monitor a transaction queue. Transactions may be written into the 'Transactions' table, which automatically populates the installation ID. The parameters to provide by the application may include:
- user—if a user is logged in this may be passed to evaluate the access rights for the user. If empty/null we execute the transaction in the context of the gateway.
- gatewayID—either user, gateway or both need to be known. If empty we need to check from the installation ID if a gateway is talking to us, if we receive the command from a service provided by the backend system 320 or the native app talking to the cloud we need to check if the gateway is unique from the user ID or we need to get back to the user with a list of gateways and confirm which one to execute the action on
- sequenceNumber—if empty/not provided we take zero. Sequence number is highly recommended to allow a client issuing multiple command (enqueuing multiple transactions) while asynchronously waiting for a response
- version—we add this to give us some flexibility evaluating the commands in the context of an API version and his way allow major API changes without breaking backward compatibility
- command—JSON encoded array containing the command name and the parameters. The parameters are command dependent and will be detailed further down in the API details section. Basic syntax is: {"command":"<command>", "paramname1":"<paramvalue1>", . . . , "paramnameN":"<paramvalueN>"}

In particular embodiments, return codes for saving a transaction may indicate successful queuing into the transaction queue.

In particular embodiments, system 300 may provide the following interfaces:

Gateway Device Interactions: Setup and Configuration
1. Initialize new Home GW ("I want to setup a new smart home"→ POST/gw/id)
2. Delete Home GW ("delete the smart home"→DELETE/gw/gw_id)
3. Re-Initialize Home GW ("restart smart home")—currently: delete
4. Add user (with role) to Home GW ("add a user to my smart home"→ POST/gw/user)
5. Delete User from Home GW ("delete user USERNAME" → DELETE /gw/user/user_id)
6. Change user's role—maintain permissions
7. Get list of users for a Home GW (e.g., for Admin page)
8. Get list of devices
9. Add device
10. Delete Device
11. Update Device—device metadata
12. Get list of Rooms
13. Add Room: in dialogs for adding devices offer current rooms plus 'znew room' and implicitly create upon storing a device located in a new room 14. Delete Room: implicit, if not used with any device for more than a certain time—autoexpire unused rooms)
15. Get Scenes (user specific list of learned and managed scenes)
16. Add scene
17. Delete Scene/Rule
18. Update Scene/Rule
19. Report device event (this may be a stream of events received from the device)

Gateway Device Interactions with Connected Devices 305 (this Might Require Either a Public IP on the Home GW or a Persistent Connection into the Cloud)
1. Get device status
2. Get device info
3. Send command to device
    a. from device capability profile (we manage capabilities in the backend based on device info we retrieve, this complexity will be hidden from the user)
    b. Home Gateway backend/messaging application (Interaction will be triggered from messaging application integration API)
        i. getContext (used to determine the intention, from an initial input analysis get all devices with the capability used in the command)
        ii. getScenes/rules—for further refinement of the user intent
        iii. triggerScene/rule Control UI (on Control Device 315) (Used for Basic Setup, Pairing of Devices and Managing the Connected Things)
1. this may also interact locally with the Home GW so can indirectly use all commands via the Home GW Gateway Device Implementation In particular embodiments, the main process running on the gateway device may (a) listen to pushes from integration layer 330 and (b) write the received push data to stdout. In particular embodiments, the hub process may be written in C.

In particular embodiments, a rules runtime interpreter may comprise a JAVASCRIPT application that reads locally-stored rules; spawns the main process and monitors its output (a) parse the pushed data received from integration layer 330 and (b) based on the parsed information, do one or more of: updating the rules; storing new rules locally; executing device control; executing queries; discovering devices; parsing the rules; waiting for triggers (time or sensor) indicated by the rules; executing events on the triggers; executing device control; running a local web server which allows triggering of the rules via local networks.

Example Push Protocol

Field "command", required, type "string", values "query"|"discover"|"control"|"rule"|"user"
"command" == "rule" operate on the rule:
    Field "rule_id" - required for "command" == "rule", type: string, id of the rule
    Field "action" - optional, type:string, values: "update"|"delete", default "update"
        "update" - updates or creates (if necessary) the rule
        "delete" - deletes the rule
        Field "rule_data" - required if "action"=="update", type:json, rule to be added/updated to rules.data
"command" == "discover" - discovers devices. No arguments. Updates PARSE devices table.
"command"=="query" - queries the device state,
"command"=="control" -controls the device:
    Field: "device_id"- required, type:string , id of the device -continued Field: "settings" - required for "command" == "control", device-specific control requests.
query posts "device_state" message back to query posts "device_state" message back to integration layer 330
"command" == "user" - backend sends an authorized user's SYSTEMID to the gateway device. This is a tradeoff when device login is not completed, otherwise the gateway device may not know which user is controlling it. The gateway device may save the user identification to a file and read it when saving a "DeviceMessage".

Device Actions

Lights
    PHILIPS HUE
        hue_get(device_id, light_id)
            Get the state (on/off status, hue, brightness, saturation, etc.) of all or a specific bulb.
        hue_set(device_id, light_id, power, bri, hue, sat)
            Set the state of a specific bulb
        hue_config(ip, user)
            Add a new user to a PHILIPS HUE bridge.
            May prompt a user to press the safety button on the PHILIPS HUE bridge
            Returns device id
Speakers
    Music player
        music player_play(device_id)
        music player_pause(device_id)
        music player_next(device_id)
        music player_previous(device_id)
        music player_play_uri(device_id)
        music player_clear_queue(device_id)
        music player_add_toqueue(device_id)
        music player_play_mode(device_id)
        music player_get_volume(device_id)
        music player_config(ip)

Gateway Initialization: In particular embodiments, the first step (after unwrapping and connecting to power) is to get the Home Gateway (home gateway) connected to the home network and the internet. For this we have the provisioning described in: home gateway BLUETOOTH provisioning/command flow. In further embodiments, the at the next step, the home GW may attempt to connect to the cloud endpoint and—obtain a unique device ID' associate the device with an owner (systemid)/login the device for online authentication (see Device Flow); maintain metadata for the device (home name, location information, etc.). In particular embodiments, at his point the Home GW is ready to discover devices in the home and take control over devices added automatically or manually to the GW. Example functionality may include: connecting the gateway to home networks, messaging application chat services, smart home bot introduction.

Device and User Management: In particular embodiments, once the GW is operational after the initial initialization we will need to add/manage the devices and users in our home and help to create/learn rules. Example functionality may include: add, delete, replace; manage metadata, group devices, and associate and modify tags etc.

Device Management: In particular embodiments, adding a device to the home by either manually triggering the process or being notified about auto-detected devices may involve:
    generating a unique cloud device ID
    creating the cloud object for the ConnectedDevice identified by the device ID and associate with the HomeGateway
    adding the cloud device ID to the gateway (the cloud will reference to the device using this ID)

adding the basic device data in the cloud:
  associating with the DeviceTemplate table (containing prototypes for all known devices)
  associating with a DeviceFunction—this may require user interaction id not uniquely associated from the DeviceTemplate. DeviceFunctions are the level at which a user controls the home. So e.g., a smart-switch might be associated with the function 'Light on/off' or 'Fan on/off' etc.—depending on the actual device behind the switch which we can not automatically detect (in general—cool thing would be to measure the current during the on/off toggle and identify the device from the characteristics of this curve, Phase 5)
  adding metadata to the ConnectedDevice from tags. A tag has a type and a value and lives within the context of a home GW (so you can name your living room 'Livingroom' today and change it to 'mywasomelivingroom' tomorrow without affecting everybody else who used 'Livingroom' in their home and only change it in one place (compared to a solution storing it in the ConnectedDevice directly)

User Management: Adding admins (so they can add devices). HomeGW may have one owner. Add users to control the home (or parts of it).

Daily Use: In particular embodiments, this may involve controlling your home but also retrieving the event feed from the devices in the cloud which we use for suggesting rules based on past behavior and personalize the smarthome experience.

In particular embodiments, a Device Login feature may help provide authentication for devices. In particular embodiments, the flow may be as follows: (1) device contacts third-party system auth endpoint with app id, client key; (2) Device receives long and short code; (3) device shows the short code to the user; (4) user goes to the device website, which does Social networking system login with the same app id; (5) User is directed to a third-party system page, where the user enters the short code; (6) the third-party system page shows the dialog with the permissions requested and asks the user to TOS the app; (7) Meanwhile, the device keeps pinging the third-party system server with the long code, asking if it has been authenticated (no more than once every five seconds, the code may expire in 10 minutes).

In particular embodiments, instead of showing the short code, the device may start broadcasting the code (BLUETOOTH, mDNS, ZIGBEE). In particular embodiments, this may work through a trusted app, not through a device-specific website or application. The login approval therefore will come from a different app id than the device app id. In further embodiments, The permissions dialog may be integrated with the trusted app UX flow. (e.g., somehow embedded in the messaging application chat window).

This might require a new endpoint.

E Data Transfer Protocol in Non-Paired Mode

Particular embodiments allow for the transfer of WIFI login information over a BLUETOOTH connection. In particular embodiments, the connection may be thought of as a TCP-like BTLE connection wherein gateway device may broadcast services available for connection, each service may be defined by a unique UUID, and wherein the service may have one or more read/write characteristics. The client device may then establish a dedicated connection with a service on gateway device.

Further embodiments allow for the transfer of data by sending and writing data. In particular embodiments, BTLE 4.0 supports the sending of very small data bursts (e.g., 20 bytes max). In further embodiments, when sending data larger than 20 bytes, only the first 20 bytes are transferred.

In particular embodiments, when transferring data larger than 20 bytes, the data may be separated into packets, each having a 20-byte size, wherein the receipt of each packet may be acknowledged by a notify packet. The payload data from the packets is assembled at the destination based on packet headers. In particular embodiments, the format of the packet may be as follows: header contains 6 bytes of information. The first two bytes of the header may identify whether or not it is the first packet to be received (e.g., designated by setting the value=1), an intermediate packet (e.g., designated by setting the value=0), or the last received packet (e.g., designated by setting the value=2). The next two bytes of the header may identify the logical packet ID. The last two bytes of the header are optional and may be used for future scalability.

Particular embodiments describe a system for seamless pairing between a user's device and a WIFI network. Traditionally, using the RASPBERRY PI WIFI configuration command line, a user may first scan for available networks, open the network configurations, and manually add credentials to connect to the a WIFI network. In particular embodiments, a WIFI configuration may become automatic over BTLE.

In particular embodiments, the system may comprise a RASPBERRY PI system, a control app (e.g., social networking application or mobile application phone app), and a home gateway image. In particular embodiments, a user may need to only open the control app, which may automatically detect wireless networks within range of the user's device, and enter the WIFI SSID and password. In particular embodiments, upon entering the WIFI SSID and password the login is complete without any need for using the RASPBERRY PI command line.

In particular embodiments, the RASPBERRY PI may broadcast a provisioning service available for connection, wherein the service may be defined by a unique UUID, and the service has read/write characteristics. In further embodiments, the user's device phone application may establish a dedicated connection with the service on the RASPBERRY PI. In particular embodiments, the system may be assigned to a particular individual at the point of sale. That is, upon opening the system and connecting the system to your network, the system may recognize that this particular device belongs to this particular user and may automatically allow the user's devices to connect to the system.

For example, below find an implementation of device access authorization and assignment. Robert's home caretaker, Sherry, messages Robert: "Hey I can't make it at the usual time tomorrow, any chance I could come by today" Robert opens the messaging application dialog with a contact corresponding to a device (e.g., Home Gateway) that controls his front door: "Give Sherry Brown key access to front door" The device replies via the messaging dialog: "Please add Sherry Brown and me to a group chat, and ask him or her to reply "yes" in the group chat." Robert starts the group chat and said: "Sherry, can you reply yes to accept the grant of key access." Sherry replies: "yes." Sherry receives message from the device (presented as a contact representing Robert's Home Front Door) "Hey you have access to open me today. Just let me know when you want to come through" Upon arrival at the home Sherry types message to "Robert's Home Front Door: "Open" message is sent to Robert that the door was opened. Lock unlocks.

In particular embodiments, for the use case above there may be ZWAVE device communications, support for full dialog within the messaging application, logic in the controller, including rules engine, and key expiration logic.

For example, below find an implementation of device access authorization and assignment. Nanny and Robert's daughter Alice arrive at home. Unfortunately, Nanny cannot find the key. Nanny messages Robert: "Hey we can't find the key" Robert opens a messaging application dialog for Home Gateway backend: "Give Sherry Brown key access to front door" Nanny receives message from Home Gateway backend (presented as a contact for Robert's Home Front Door) "Hey you have access to open me. Just say so!" Nanny types message: "Open" Lock unlocks.

In particular embodiments, for the use case above there may be ZWAVE device communications, support for full dialog within the messaging application, logic in the controller, including rules engine, and key expiration logic.

For example, below find an implementation of device provisioning, potentially using ZIGBEE or ZWAVE. Robert gets a new smart light in the mail. Robert opens the box, and screws in the light. In particular embodiments, ZWAVE provisioning may be required to initiate scan on the mobile application. In such situations, Robert may be required to initiate the scan. Robert receives a message from a contact representing the Home Gateway backend: "Hey XXX light you recently purchased is powered on and ready to join your network. Give Access?" Robert replies: "Yes" Home Gateway backend asks: "What shall we call this light?" Robert replies: "Alice Room Light" Home Gateway backend replies: "Confirmed, naming XXX plug Alice Room Light" An application replies: "Do you want to use a switch to control your device? Reply index to select one switch. Reply no to cancel. (1). Alice room switch (2). backstreet switch". Robert says: "1"

A contact corresponding to the Home Gateway application replies: "Alice Room Switch now controls Alice Room Light (rule saved)" Robert says: "Turn Alice Room Light on" The contact corresponding to the Home Gateway replies "Turning on Alice Room Light" and the light turns on. Later, after Alice is put to bed, she gets up and turns the light on manually. The light switch Alice presses on is a pre-provisioned WEMO WIFI Smart Switch. The contact corresponding to the Home Gateway responds: "Robert, Alice Room Light was turned on. (Alternatively) "Robert, is Alice room light on?" The contact corresponding to the Home Gateway: "Alice room light is on" Robert: "Turn Alice room light off" Robert: "Turn on Alice room light 9 am tomorrow." The contact corresponding to the Home Gateway: "Rule saved"

In particular embodiments, for the use case above, there may exist an API for specific light/plug support, support may exist for supporting full dialog in a messaging application, AnyDevice may be enabled to sign on to WIFI, logic in the controller—including rules engine, and ZWAVE device communications and provisioning flow may be implemented.

For example, below find an alternative to the use case above using RASPBERRY PI, BT/WIFI). Robert gets a new smart plug in the mail. Robert opens the box, and connects his living room light to the smart plug. Robert receives a message from the Home Gateway backend: "Hey XXX smart plug you recently purchased is powered on and ready to join your network. Give Access?" Robert replies: "Yes" Home Gateway backend asks: "What shall we call this plug?" Robert replies: "Alice Room Light" Home Gateway backend replies: "Confirmed, naming XXX plug Alice Room Light" Robert says: "Turn Alice Room Light on" Home Gateway backend replies "Turning on Alice Room Light" and the light turns on. Later, after Alice is put to bed, she gets up and turns the light on manually. Home Gateway backend: "Robert, Alice room light was turned on" (Alternatively) Robert: "Home Gateway backend is Alice room light on?" Home Gateway backend: "Alice room light is on" Robert: "Turn it off."

In particular embodiments, for the use case above, BT/WIFI device provisioning flow may be implemented (home gateway BLUETOOTH provisioning/command flow).

Additionally, RASPBERRY PI image may be fully functional, an API for specific lights/plug support, supporting full dialog within the messaging application, AnyDevice may be enabled to sign on to WIFI, logic in the controller, including rules engine, and a plug fixture wired to RASPBERRY PI.

Use Case: Sending Invitations. When people who were invited come to the area of the event, they receive a notification. "Wireless access point available to join—do you want to connect?" (triggered using Beacon). If person accepts, they are automatically transitioned over to the event WIFI network. Music playlist at the event is curated based on the overall tastes and preferences of the event attendees. Event owner launches music by messaging Home Gateway backend: "Start playing event music". A group chat (named after the event) is automatically created, so people can make explicit requests for music/pictures. When an event attendee posts a picture to the group chat, it gets forwarded to screen based device displayed at the event. In further embodiments, there may be app-based bootstrapping. In further embodiments, for attendees that don't have the app installed, a message may be sent to a messaging application on the user's device with a link to the app upon confirming joining the event and prompt the user to sign in. In further embodiments, there may be presence detection. In particular embodiments, the control app may listen for an iBeacon. In particular embodiments, the application or service runs a BTLE scan in background. The scan is triggered by a push notification from integration layer 330 five minutes before the event starts, and will be stopped by the application or service once the user acts on the notification, or at the end of the event (at the latest). In particular embodiments, the app will register the iBeacon with the OS, which will trigger it when the beacon is detected. In further embodiments, once the app detects the iBeacon and is awoken, it will scan for specific BT service broadcast with unique ID for the event. In particular embodiments, the system may use the Gravity rotating code for this, and call the GraphQL endpoint to get the URL associated with the Gravity beacon, which points to the event page. In further embodiments, the system may broadcast an event specific ID from the home gateway. In further embodiments, the application may also read BT broadcast with the WIFI credentials.

In particular embodiments, for the use case above, flow from event to curated attendees may be implemented in group chat. Additionally, allow for UI for notification and transfer to the new WIFI network (AnyDevice), generating playlists on "likes," streaming music (to be integrated with a music player), redirect group chat photo to a second screen, display on a second screen.

Control, Management, and Activation of Smart Devices Using Messaging Application Particular embodiments allow for a user to communicate via a messaging application to control, manage, or activate a user's smart devices. In further embodiments, a human-like-intelligence may be implemented within a messaging application such that a user is able to use natural language while controlling, managing, or activating a user's smart devices. In particular embodiments, upon a user asking that a particular light be turned on, the messaging application may not need to be told which precise light needs to be turned on, but may be able to infer which light to turn on based on surrounding factors. For example, upon messaging application notifying a user that the kitchen light has been turned on due to activity, the user may simply send a message to a contact that corresponds to a device that controls lighting "Turn off the light" without indicating it is the kitchen light the user wished to turn off. The messaging application may know to turn off the kitchen light in response to receiving the user's message.

In further embodiments, the user may have the ability to query, program, and manage smart devices using a messaging application. For example, "list my home devices." In further embodiments, the user has the ability to control smart devices using a messaging application's input.

In further embodiments, the user has the ability to receive data, notifications, and alerts from smart devices using messaging application's input. For example: "Your front door has been opened." In further embodiments, the messaging application has the ability to understand human natural language chat with users within the context of smart devices. In particular embodiments, this may be done by parsing text from messaging application. In further embodiments, the messaging application has the ability to build context from previously used devices and infer which ones to use. That is, based on historical context from the messaging application and the user, the messaging application may infer from which device the user wants to control or manage.

In further embodiments, the device graph (which, in some embodiments, may be included in the social graph) may include nodes that are associated with smart devices. In particular embodiments, the smart devices may be devices located in a user's home. In further embodiments, each device located in a user's home may be represented by a node in the device graph. In further embodiments, upon creating a new connection, the node may create an edge between the node and the new connection. In further embodiments, the user's device may contain edges between other users in the graph or even other devices.

In particular embodiments, temporary access to connected devices using a messaging application may be employed. In particular embodiments, the system may determine two users have a friendship coefficient above a pre-defined threshold, in which case a user may be allowed temporary access to a device. For example, where two parties on a social network have a friendship coefficient above a pre-defined threshold, the system may send a temporary door-open token via a messaging application, such that when the friend is in the user's neighborhood, the friend may stop by the user's house and freely enter the front door. In further embodiments, the backend connection to the HUB may be the channel authorization the use of the token (e.g., the sender of the token needs to have the permissions to share).

In particular embodiments, access and authorization may be implementing through adding a friend to a messaging chat session. In particular embodiments, a more generalized version may be employed by using a messaging application chats as an easily understood group framework for authorization. In particular embodiments, the system may grant a time-limited access to a network by creating temporary WIFI networks and thereafter deleting them at the time limit. In further embodiments, the temporary WIFI SSID may be broadcast through an out of band mechanism (e.g., through an event invitation or push notification), thereby allowing for automatic connections when particular users arrive within the vicinity of the WIFI, or arrive to a particular location (e.g., if the SSID is hidden).

In particular embodiments, a system may learn the habits and behaviors of a user at which point the system may generate automatic rules. For example, upon a user coming home the user always turns on the stereo. The system may determine the user always turns the stereo on upon arriving home, at which point the system would generate a rule—if user comes home, turn on stereo.

In particular embodiments, the system may learn the user's trends and habits and calculate a score for particular rules. Upon the score reaching a certain threshold the rule may start to be employed by the system. In particular embodiments, the system may take into account environmental concerns (e.g., light or dark outside, cold or hot, etc.). In further embodiments, rules will be specific to each event and there will be exceptions to each event. In particular embodiments, the set of conditions from the HUB may process all smart devices located within the user's house (e.g., music player, locks for doors, appliances, etc.).

In particular embodiments, an event is generated by a connected device (e.g., door opened/closed, light in the bathroom turned on). In particular embodiments, a condition pertains to the environment. In particular embodiments, a delta refers to the time slice between events.

In particular embodiments, each time an event occurs, the events within a delta (Dmax for example equals 1 minute, determined experimentally), called a sequence are evaluated (e.g., Event1, Event2, . . . ). In further embodiments, a score is generated for the sequence, Ssequence=1−Π(Dmax−min (deltaN,Dmax))/Dmax. In further embodiments, this Ssequence may be evaluated against previous sequences and conditions. In further embodiments, if the sequence with the same condition appears to occur, then the score may be multiplied by the current Ssequence. In further embodiments, a later calculation may be employed to determine whether or not the score reaches a certain threshold.

Gateway Application API

In particular embodiments, the home Gateway Application sits between the physical hardware devices we are controlling and the backend, which the user interfaces with in order to control the devices. As such, the gateway is in charge of taking commands sent to it from the backend and converting them to instructions, which will control the physical devices.

Inputs: Pushes from Integration Layer 330: In particular embodiments, generic push structure may be in curl format:

```
curl -X POST \
-H "X-PARSE-Application-Id: *PARSE APP ID*" \
-H "X-PARSE-REST-API-Key: *PARSE REST KEY*" \
-H "Content-Type: application/json" \
-d "{
    "where": {
        "installationId": *GATEWAY INSTALLATION ID*
        "deviceType": "embedded"
    },
    "data": {
        "command": *COMMAND*
        ...
    }
}"
```

In particular embodiments, the App ID (e.g., device ID) and REST key should be taken from the particular device being used. The current app's id/key are: "ro2sqHypZCVs4qe6dwvj31gOYLaux6hBFGd6J54g", "dl5gBnYcsubgJtG91dGPYi0x40rFWu2ZyNxJ6inZ". In particular embodiments, the where clause may be used when we want to direct a push to a single device. In particular embodiments, it may be omitted to send a push to all devices. In particular embodiments, the gateway installation ID is a unique identifier generated for each device. It may also be stored in integration layer 330 in the HomeGateway/ Installation tables. In particular embodiments, the command can be one of: rule, discover, query, control, update. Each of these commands expects specific fields to follow the command key which are outlined below.

Rule: In particular embodiments, the following outlines an example structure of the push data fields if a rule command is specified:

```
"data": {
    "command": "rule",
    "action": "update / delete",
    "rule_id": "rule_id",
    "rule_data": {
        "name": "rule_name",
        "trigger": "*DESCRIBED BELOW*",
        "cron": "* * * * *",
        "conditions": "*DESCRIBED BELOW*",
        "actions": "*DESCRIBED BELOW**SAME AS CONTROL
            COMMAND*"
    }
}
```

In particular embodiments, the command is the same as above. In this case, it specifies that the current push deals with a rule. In particular embodiments, the action field specifies what will be happening with the rule—either "update" or "delete". If not specified, it will default to update. Update should be used to create or update rules, and delete will delete a rule. In particular embodiments, the rule_id field specifies what rule will be acted upon. It must always be specified even if a new rule is being created (in which case it will be used as the new rule's id). It may also be unique. In particular embodiments, the rule_data field is used only for update actions and is not used for delete actions. It contains the data that will be used to update/save the rule with. The specific fields are below. In further embodiments, The name field specifies the name for the rule. This should typically be a more friendly name for the rule with which the user can use to reference it. In further embodiments, the trigger field is used to specify the trigger for the rule. Two types of triggers are supported—a device based trigger, which is fired when a device enters a certain state, and a time-based trigger, which is used to set off cron jobs. In particular embodiments, the trigger field should look like the following. The event field is structured identically to the "state" field on a condition, except it does not support "time". See that section for further information.

```
"trigger": {
    "deviceId": "dev_id",
    "event": {
        "check_type": "range",
        "range_min": 0,
        "range_max": 1
    }
    OR
    "event": {
        "check_type": "value",
        "value": 1
    }
}
```

In particular embodiments, the cron field specifies a cron job for the rule which will cause the rule to be executed at specific times. It will only be referenced if the trigger's event field is the string "time". In particular embodiments, the conditions field allows for further conditions to be specified before execution of the rule. It is formed as a JSON tree which supports AND, OR, and NOT logical operators. It can further be used to check the current time, and whether or not a device is in a specific state. An example of a conditions field is shown below.

In further embodiments, the type field specifies whether this is a state check or a logical operation. As mentioned above, the logical operations supported are AND, OR, and NOT. Three state checks are supported: value, range, and time.

In further embodiments, the check_type field is used to specify the type of state check being defined. It is not needed for logical operations. Value checks are used to make sure a device is in a specific state. Range checks offer the same functionality as a value check, except they allow a range of values to be specified. Time checks are used to specify the time in which the rule should be executed. In particular embodiments, if a range or time check is define, the range_min and range_max fields must be specified. In particular embodiments, if a value check is define, value must be specified.

In further embodiments, the state_name field is used to specify the particular parameter being checked. For range and value checks, these are the values of the device being checked. For a time check, this can either be minutes, hours, date, day, or month. To specify an exact value for a time check (similar to a value check but for time), the same number should be used in the range_min and range_max fields.

```
"conditions": {
    "type": "and",
    "and": [
        {
            "type": "state",
            "deviceId": "abcd1234",
            "check_type": "range",
            "state_name": "volume",
            "range_min": 70,
            "range_max": 100
        },
        {
            "type": "or",
            "or": [
                {
                    "type": "not",
                    "not": [
                        {
                            "type": "state",
                            "deviceId": "abcd1234",
                            "check_type": "value",
                            "state_name": "current_track_id",
                            "value": 440
                        }
                    ]
                },
                {
                    "type": "state",
                    "check_type": "time",
                    "state_name": "month",
                    "range_min": 4,
                    "range_max": 8
                }
            ]
        }
    ]
}
```

In particular embodiments, the actions field tells the rule exactly what should happen if the rule is triggered and the conditions are met. An example is below. In further embodiments, the deviceId field specifies what device the actions will be performed on. In further embodiments, the actions field shows what parameters should be changed on the device, and what each parameter should be set to. Note: currently these should be in the same format that a Control command would use, except only one parameter should be specified in a single element in the array.

```
"actions": {
    "deviceId": "abcd1234",
    "settings": [{
        "on_off": "on",
        "bri": 10
    }]
}
```

In particular embodiments, the following is an example of a complete rule:

```
{
    "name": "rule1",
    "cron": "* * * * *",
    "trigger": {
        "deviceId": "asdfqwer",
        "event": {
            "check_type": "range",
            "range_min": 0,
            "range_max": 1
        }
    },
    "conditions": {
        "type": "and",
        "and": [
            {
                "type": "state",
                "deviceId": "abcd1234",
                "check_type": "range",
                "state_name": "volume",
                "range_min": 70,
                "range_max": 100
            },
            {
                "type": "or",
                "or": [
                    {
                        "type": "not",
                        "not": [
                            {
                                "type": "state",
                                "deviceId": "abcd1234",
                                "check_type": "value",
                                "state_name":"current_track_id",
                                "value": 440
                            }
                        ]
                    },
                    {
                        "type": "state",
                        "check_type": "time",
                        "state_name": "month",
                        "range_min": 4,
                        "range_max": 8
                    }
                ]
            }
        ]
    },
    "actions": {
        "deviceId": ""abcd1234",
        "settings": [{
            "on_off": "on",
```
```
            "bri": 10
        }]
}
```

Discover: In particular embodiments, a discover command does not require further arguments. Thus, a full discover command looks like:

```
"data": {
    "command": "discover"
}
```

Query: In particular embodiments, a command requires the ID of the queried device, as well as what type of device it is. An example of a query command looks like:

```
"data": {
    "command": "query",
    "deviceId": "abcd1234",
    "deviceType": "music player"
}
```

Control: In particular embodiments, a command causes the Gateway to change the current state of the given device given the parameters that are passed in. The parameters correspond to the type of device being controlled, so there is no one-size-fits-all for a control command at this time. Examples for each supported device are given below.

```
"data": {
    "command": "control",
    "deviceId": "abcd1234",
    "settings": [{
        "volume": 100, // For parameterized functions
        "media_action": "play" // For nonparameterized functions
    }]
}
```

In particular embodiments, a device cloud (e.g., in a home) may have a corresponding instance in the cloud. Each device action (user command, device alert etc.) may be logged and sent over a messaging queue of the device cloud instance. A recipe may contain one or multiple rules. A rule may have a device action, which can be executed with timing or triggered by another action. A particular device cloud instance may have a rule execution engine for digesting device action messaging queue and execute rules.

In particular embodiments, the base rule may be:

```
class Rule:
    def check(self):
        return True
    def action(self):
        print 'doing nothing'
    def reply(self):
        return 'I am not the guy you are looking for'
```

In particular embodiments, the schedule rule may be:

Recipe:{"name":"livingroom_hue_rule1","listens_to":
"front_door_lock","condition":{"livingroom_occupancy":

```
{"$eq":False}},"action":{"type":"control",
"value":"off"}}
```

```
class livingroom_hue_rule1(Rule):
    device_name = 'livingroom_hue'
    schedule = "0 0 * * *" 2 standard cron syntax
    def check(self):
        return current_user in home.livingroom.users
            and home.livingroom.occupancy == False
    def action(self):
        home.livingroom_hues.action("control", "off")
    def reply(self):
        return 'lights in living room were turned off'
```

In particular embodiments, the trigger rule may be:

```
Recipe:{"name":"livingroom_hue_rule2","listens_to":
"front_door_lock","condition":{"front_door_lock":
{"$eq":2}},"action":{"type":"control",
"value":"off"}}
```

```
def reply(self ):
    return 'lights in living room were turned off 'class
livingroom_hue_rule2(Rule):
    device_name = 'livingroom_hue'
    listens_to = ['front_door_lock']
    def check(self):
        return current_user in home.livingroom.users
            self.front_door_lock == 2 2 2 is open
    def action(self):
        home.livingroom_hues.action('control', 'on')
    def reply(self):
        return 'lights in living room were turned off'
```

In particular embodiments, the execution engine may be:

```
def add(rule):
    self.rules.add(rule)
    self.schedules.add(rule.schedule, rule)
    self.listens_to(rule.listens_to , rule)
def run( ):
    while hasMessage( ):
        message = nextMessage( )
        switch message.type:
            case 'rule': // scheduled rule
                rule = self.rules[message.rule_name]
                rule.action( )
                rule.reply( )
                break
            case 'action': // trigger rules
                self.rules[device_name].action( )
                for rule in self.listens_to[action.device_name]:
                    rule.action( )
                    rule.reply( )
                break
```

In further embodiments, there may be rules incorporating permissions, capabilities, events, and actions.

In particular embodiments, the system may benefit from having dedicated hardware Point of Presence (POP). In further embodiments, this may be performed through a mobile application. Benefits of a dedicated hardware POP may include:

Seamless provisioning of WIFI—for the Blink scenario, where the device acts as an access point (AP) on both.

Continuous scanning for new devices—typically, phone apps cannot continuously scan BT or WIFI for new devices that show up, and so they require the user to explicitly request scanning.

Dual-band WIFI networks—if the phone is connected to 5 GHz and the device is connected to 2.4 GHz, discovery and control can be problematic.

BT pairing—multiple phones paired with a BT device have priority, and switching between them is not easy and seamless. Dedicated POP only solves this problem, by proxying the device control from any phone through the POP.

Firmware update scheduling and handling—firmware update through the device app happens when the user opens the app, which is at the time the user wants to use the device. Having an always on POP would enable a firmware OTA update that can be scheduled at convenient time based on type of device. For example, lights will be update during the day when not needed, coffee machine during the night when not likely to be used at all, thermostat at time scheduled for low temp, etc.

Time to use/responsiveness—phone apps for controlling connected devices that are used not that often may be killed by the OS. When accessed by the user, the cold start can impact the time to use (app launch to the moment the user can control the device), thus leading to a frustrating delay and lower responsiveness. Always on voice controlled hardware POP can increase the time to use/responsiveness.

Figure 4:
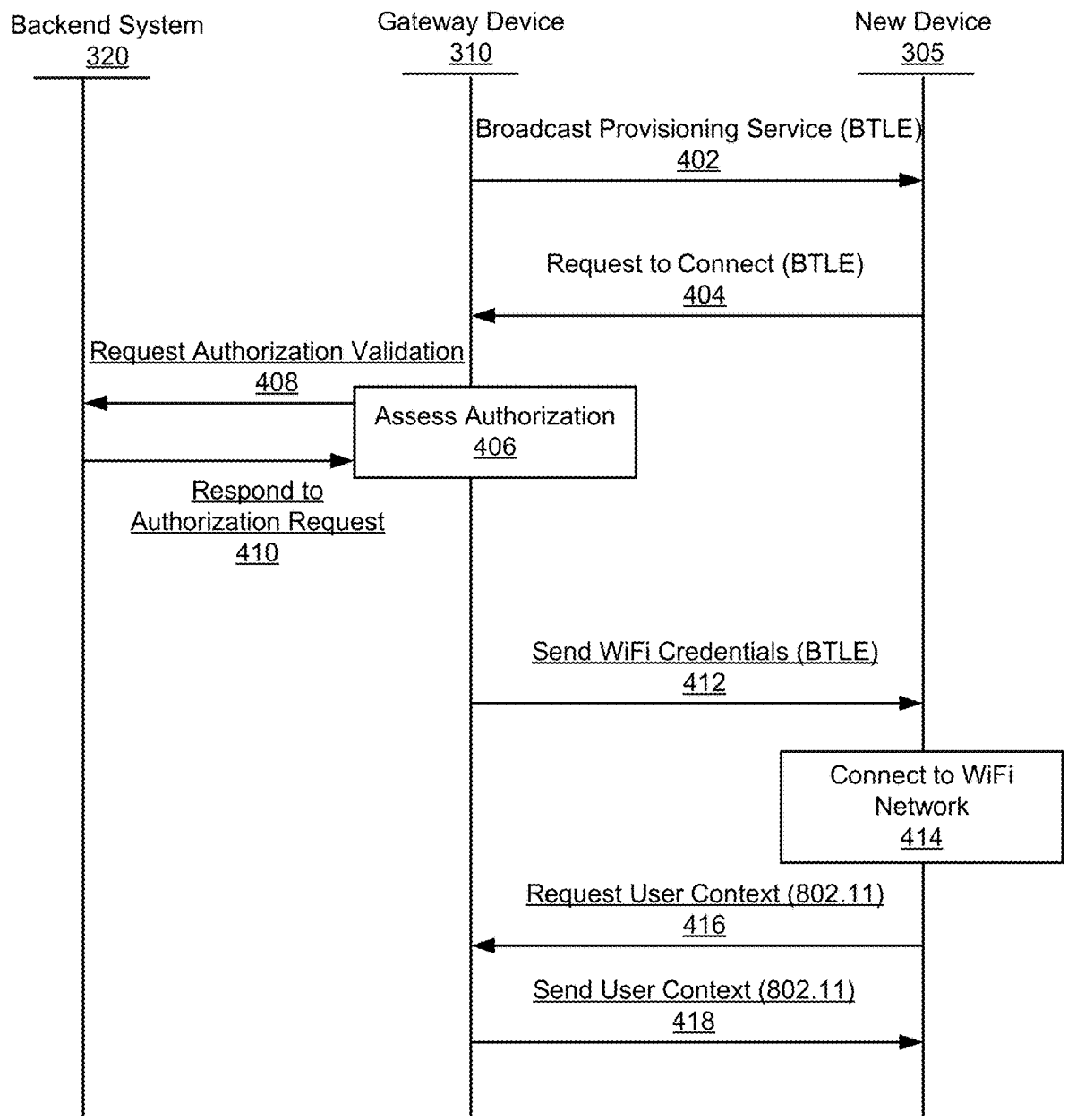
FIG. 4 illustrates an example interaction diagram of a data flow for establishing new device access to a credential network.

FIG. 4 illustrates an example interaction diagram of data flow 400 for establishing device access to a restricted network (e.g., a WIFI network) requiring access credentials by requesting the access credentials over an open network (e.g., a BTLE network). FIG. 4 illustrates data flow 400 between backend system 320, gateway device 310, and device 305. Gateway device 310 may interface with backend system 320, which may be hosted on a remote server or a group of servers. Gateway device 310 may be provided with various credentials. In particular embodiments, gateway device 310 may be provided with WIFI credentials (e.g., WIFI SSID and password).

In particular embodiments, gateway device 310 may provide a number of services and may even broadcast (402) information over the open network regarding the available services. Each service may have different read/write characteristics and may be identified by a unique identifier (UUID). In particular embodiments, a provisioning service to provide devices with access credentials for the restricted network may be provided over any radio frequency communications protocol that highly restricts packet size (e.g., 20 B max). In particular embodiments, the provisioning service may use BTLE, ZIGBEE, ZWAVE, NFC.

In particular embodiments, device 305 may request (404) to connect to gateway device 310, wherein the request may be sent using a highly restricted micro packet radio frequency data protocol (e.g., the BTLE pre-pairing protocol, which restricts packet size to a maximum of 20 B).

In particular embodiments, upon receiving the request from device 305, gateway device 310 may determine if device 305 is authorized to connect to the restricted network. In particular embodiments, gateway device 310 may assess (406) the identifying information for device 305 to determine if device 305 is authorized to establish a connection with the restricted network.

In some embodiments, gateway device 310 may request (408) authorization validation from backend system 320 by sending the identifying information for device 305. Backend system 320 may assess the identifying information for device 305 and respond (410) to the authorization request from gateway device 310 by sending the authorization validation (e.g., confirming authorization) or by sending a denial of authorization.

In some embodiments, gateway device 310 may assess (406) the authorization of device 305 based on authorization information that was previously received and cached prior to receiving any requests from client devices for the access credentials. For example, gateway device 310 may be assigned to a particular individual at the point of sale. That is, upon opening gateway device 310 and connecting gateway device 310 to the restricted network, gateway device 310 may recognize that device 305 is already owned by an authorized user, and gateway device 310 may immediately send device 305 the access credentials to connect to the restricted network.

In particular embodiments. gateway device 310 may send (412) the access credentials (e.g., WIFI SSID and password) to device 305 by writing data characteristics from gateway device 310, wherein data representing the access credentials may be segmented into small-size packets to be transmitted over a highly restricted micro packet radio frequency data protocol. For one example, data representing the WIFI credentials may be segmented into 20 B packets to be transferrable over BTLE.

In particular embodiments, the data representing the access credentials may be segmented into twenty-byte packets, wherein the format of a packet consists of a six-byte header and a fourteen-byte payload. This numerical arrangement is just provided as an example. One of ordinary skill in the art would realize many other suitable arrangements of the twenty bytes. In particular embodiments, a header may be separated further. In one example of a six-byte header, bytes one and two may identify whether the packet is a first packet, an intermediate packet, or a last packet in the series; bytes three and four may identify the logical packet identification; bytes five and six may be available for scalability. One of ordinary skill in the art would realize that any suitable representation of sequencing information in the header may be used to facilitate re-assembly of the data representing the access credentials from the payloads of the packets.

In particular embodiments, the client device may send a message to gateway device 310 to acknowledge receipt of each micro packet. In particular embodiments, small data packets transferrable over highly restricted micro packet radio frequency data protocol may be assembled at device 305 by using the sequencing information in the packet headers. In particular embodiments, the access credentials transferred over a highly restricted micro packet radio frequency data protocol, once assembled, may be used to configure device 305, allowing device 305 to connect (414) to the restricted network (e.g., WIFI network).

In particular embodiments, once device 305 establishes a connection to the restricted network (e.g., satellite, BLUETOOTH, WIFI), gateway device 310 and device 305 may exchange information over the restricted network. For example, in particular embodiments, the restricted network may be a WIFI network, and gateway device 310 and device 305 may exchange information over the WIFI network protocol (e.g., 802.11). In some example embodiments, where device 305 is a brand-new device, the exchanged information may include typical information to provision a new device for a user. By way of example and not limitation, device 305 may request (416) user context information such as user authentication credentials for other services, user preference and privacy settings, and user-related historical information, as well as other relevant information, such as information regarding other devices in the user's device cloud, credentials to access and/or control the other devices, etc. Upon receiving such a request, gateway device 310 may send (418) the user context and any other requested information to device 305.

Figure 5:
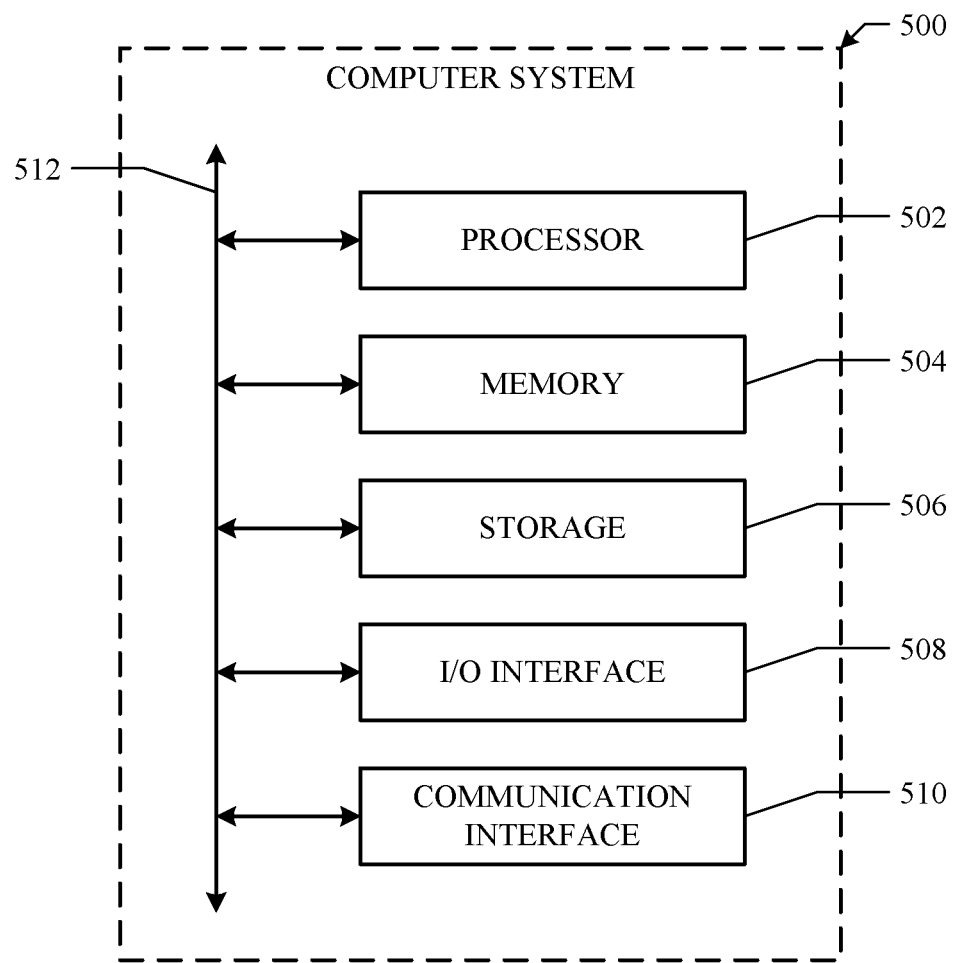
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a gateway computing device, providing a provisioning service for access credentials;
by the gateway computing device, receiving, from a client device, a request for the access credentials, wherein the request was sent using a restricted-packet-size protocol;
by the gateway computing device, assessing the client device to determine whether the client device is authorized to establish a connection with a network, wherein the gateway computing device is configured to access the client device using information that was previously received and cached prior to the gateway computing device receiving any requests from client devices for access credentials;
in response to determining that the client device is associated with an authorized user, by the gateway computing device, segmenting data comprising the access credentials into a plurality of packets, wherein size of each of the plurality of packets conforms to a threshold size limit of the restricted-packet-size protocol, and wherein each of the plurality of packets comprises a header including sequencing information specifying an order in which the packet should be assembled with other packets at the client device of the user for re-constructing the data comprising the access credentials; and
by the gateway computing device, sending, to the client device, the plurality of packets comprising the access credentials using the restricted-packet-size protocol, wherein the data comprising the access credentials is re-assembled at the client device of the user using the sequencing information included in the packets.

2. The method of claim 1, wherein the access credentials comprise authorization credentials to send messages using a different protocol than the restricted-packet-size protocol.

3. The method of claim 2, wherein the restricted-packet-size protocol is designed to limit power usage by devices sending messages using the restricted-packet-size protocol.

4. The method of claim 3, wherein the restricted-packet-size protocol is BLUETOOTH LOW ENERGY and the different protocol is WIFI.

5. The method of claim 4, wherein the request specifies a universally unique identifier (UUID) for the provisioning service.

6. The method of claim 1, wherein the client device can send messages to the gateway computing device using the restricted-packet-size protocol without first pairing with the gateway computing device.

7. The method of claim 1, wherein each of the plurality of packets further comprises a payload, wherein the payloads for the packets comprise the segmented data.

8. A gateway computing device comprising one or more processors and a memory coupled to the processors comprising instructions executable by the processors, the processors being operable when executing the instructions to:
provide a provisioning service for access credentials;
receive, from a client device, a request for the access credentials, wherein the request was sent using a restricted-packet-size protocol;

assess the client device to determine whether the client device is authorized to establish a connection with a network, wherein the gateway computing device is configured to access the client device using information that was previously received and cached prior to the gateway computing device receiving any requests from client devices for access credentials;

in response to a determination that the client device is associated with an authorized user, segment data comprising the access credentials into a plurality of packets, wherein size of each of the plurality of packets conforms to a threshold size limit of the restricted-packet-size protocol, and wherein each of the plurality of packets comprises a header including sequencing information specifying an order in which the packet should be assembled with other packets at the client of the user for re-constructing the data comprising the access credentials; and send, to the client device, the plurality of packets comprising the access credentials using the restricted-packet-size protocol, wherein the data comprising the access credentials is re-assembled at the client device of the user using the sequencing information included in the packets.

9. The gateway computing device of claim 8, wherein the access credentials comprise authorization credentials to send messages using a different protocol than the restricted-packet-size protocol.

10. The gateway computing device of claim 9, wherein the restricted-packet-size protocol is designed to limit power usage by devices sending messages using the restricted-packet-size protocol.

11. The gateway computing device of claim 10, wherein the restricted-packet-size protocol is BLUETOOTH LOW ENERGY and the different protocol is WIFI.

12. The gateway computing device of claim 11, wherein the request specifies a universally unique identifier (UUID) for the provisioning service.

13. The gateway computing device of claim 8, wherein the client device can send messages to the gateway computing device using the restricted-packet-size protocol without first pairing with the gateway computing device.

14. The gateway computing device of claim 8, wherein each of the plurality of packets further comprises a payload, wherein the payloads for the packets comprise the segmented data.

15. One or more computer-readable non-transitory storage media embodying software that is operable when executed by one or more processors of a gateway computing device to:

provide a provisioning service for access credentials;

receive, from a client device, a request for the access credentials, wherein the request was sent using a restricted-packet-size protocol;

assess the client device to determine whether the client device is authorized to establish a connection with a network, wherein the gateway computing device is configured to access the client device using information that was previously received and cached prior to the gateway computing device receiving any requests from client devices for access credentials;

in response to a determination that the client device is associated with an authorized user, segment data comprising the access credentials into a plurality of packets, wherein size of each of the plurality of packets conforms to a threshold size limit of the restricted-packet-size protocol, and wherein each of the plurality of packets comprises a header including sequencing information specifying an order in which the packet should be assembled with other packets at the client device of the user for re-constructing the data comprising the access credentials; and send, to the client device, the plurality of packets comprising the access credentials using the restricted-packet-size protocol, wherein the data comprising the access credentials is re-assembled at the client device of the user using the sequencing information included in the packets.

16. The one or more computer-readable non-transitory storage media of claim 15, wherein the access credentials comprise authorization credentials to send messages using a different protocol than the restricted-packet-size protocol.

17. The one or more computer-readable non-transitory storage media of claim 16, wherein the restricted-packet-size protocol is designed to limit power usage by devices sending messages using the restricted-packet-size protocol.

18. The one or more computer-readable non-transitory storage media of claim 17, wherein the restricted-packet-size protocol is BLUETOOTH LOW ENERGY and the different protocol is WIFI.

19. The one or more computer-readable non-transitory storage media of claim 18, wherein the request specifies a universally unique identifier (UUID) for the provisioning service.

20. The one or more computer-readable non-transitory storage media of claim 15, wherein the client device can send messages to the gateway computing device using the restricted-packet-size protocol without first pairing with the gateway computing device.

* * * * *